United States Patent [19]
Min

[11] Patent Number: 5,808,782
[45] Date of Patent: Sep. 15, 1998

[54] THIN FILM ACTUATED MIRROR ARRAY HAVING SPACING MEMBER

[75] Inventor: Yong-Ki Min, Seoul, Rep. of Korea

[73] Assignee: Daewoo Electronics, Co., Ltd., Seoul, Rep. of Korea

[21] Appl. No.: 695,320

[22] Filed: Jul. 29, 1996

[30] Foreign Application Priority Data

Jul. 31, 1995 [KR] Rep. of Korea ................... 1995-23348
Jul. 31, 1995 [KR] Rep. of Korea ................... 1995-23397

[51] Int. Cl.⁶ ..................................................... G02B 26/00
[52] U.S. Cl. .......................... 359/292; 359/295; 359/871; 359/850; 310/328; 348/771
[58] Field of Search ..................................... 359/254, 290, 359/291, 295, 871, 850; 310/328; 348/771, 764

[56] References Cited

U.S. PATENT DOCUMENTS 5,604,623 2/1997 Ji et al. .................................... 359/295
5,627,673 5/1997 Min .......................................... 359/290

*Primary Examiner*—Loha Ben
*Attorney, Agent, or Firm*—Pennie & Edmonds LLP

[57] ABSTRACT

A method for electrically connecting a thin film electrode with a connecting terminal on an active matrix in a thin film actuated mirror includes the steps of: forming a thin film sacrificial layer having an empty cavity on top of the active matrix, wherein the empty cavity encompasses the connecting terminal; forming an elastic layer on top of the thin film sacrificial layer including the empty cavity; creating a hole on the elastic layer, the hole exposing the connecting terminal and having inner surfaces; forming the thin film electrode on top of the elastic layer including the inner surfaces of the hole to thereby establish an electrical connection between the thin film electrode to the connecting terminal; and filling the hole with an insulating material. The insulating material prevents the thin film electrodes in each of the thin film actuated mirrors from coming into an electrical contact with each other, thereby preventing a short-circuit therebetween.

12 Claims, 7 Drawing Sheets

THIN FILM ACTUATED MIRROR ARRAY HAVING SPACING MEMBER

FIELD OF THE INVENTION

The present invention relates to an array of M×N thin film actuated mirrors; and, more particularly, to an improved method for establishing an electrical connection between a thin film electrode and a connecting terminal in each of the thin film actuated mirrors.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIG. 1, there is illustrated an array 100 of M×N thin film actuated mirrors 101, wherein M and N are integers, disclosed in a copending commonly owned application, U.S. Ser. No. 08/581,015, entitled "THIN FILM ACTUATED MIRROR ARRAY HAVING DIELECTRIC LAYERS", the array 100 including an active matrix 10, an array of M×N conduits 25, an array of M×N actuating structures 90 and M×N number of multilayer stacks of thin film dielectric members 75.

The active matrix 10 includes a substrate 12, an array of M×N connecting terminals 14 and array of M×N transistors (not shown), wherein each of the connecting terminals 14 is electrically connected to a corresponding transistor.

Each of the actuating structures 90 includes an elastic member 35, a second thin film electrode 45, a thin film electrodisplacive member 55 and a first thin film electrode 65. The first and the second thin film electrodes 65, 45 are, respectively, located on top and bottom of the thin film electrodisplacive member 55. The elastic member 35 is positioned on bottom of the second thin film electrode 45. The first thin film electrode 65 made of an electrically conducting and light reflecting material is electrically connected to ground, allowing it to function as a mirror as well as a common bias electrode in each of the actuating structures 90. The second thin film electrode 45 made of an electrically conducting material is electrically connected to a corresponding connecting terminal 14, allowing it to function as a signal electrode in each of the actuating structures 90.

Each of the multilayer stacks of thin film dielectric members 75 for ensuring an optimum optical efficiency of each of the thin film actuated mirrors 101 is placed on top of each of the actuating structures 90, wherein each of the thin film dielectric members 75 has a predetermined thickness and a specific refractive index.

Each of the conduits 25 functions as a means for electrically connecting the second thin film electrode 45 to the corresponding connecting terminal 14. Each of the conduits 25 is formed by: first creating an array of M×N holes (not shown), each of the holes extending from top of the elastic member 35 to top of the connecting terminal 14 by using an etching method; and filling therein with the metal by using a sputtering method. The second thin film electrode 45 is then formed directly on top of each conduit 25, thereby electrically connecting the second thin film electrode 45 to the corresponding connecting terminal 14, and this is rather cumbersome.

There is illustrated in FIG. 2 another method for establishing an electrical connection between the second thin film electrode 45 to the corresponding connecting terminal 14, the method involving a formation of a contact hole 80 in place of the conduit 25 in the elastic member 35, followed by a formation of the second thin film electrode 45.

There are a number of problems associated with the contact hole 80 shown in FIG. 2, however, one of them being the formation of cracks. After the formation of the second thin film electrode 45, there is formed the thin film electrodisplacive member 55 on top thereof, which is then heat treated to allow a phase transition to take place. The heat treatment of the thin film electrodisplacive member 55, however, results in the formation of cracks at a portion of the thin film electrodisplacive member 55 deposited in the contact hole 80. The cracks may lead to an establishment of an electrical connection between the first thin film electrode 65 which is subsequently formed on top of the thin film electrodisplacive member 55 and the second thin film electrode 45, resulting in a short-circuit therebetween. Since the first thin film electrode 65 in each of the actuating structures 90 is interconnected with other first thin film electrodes (not shown) in the same row or column in the array 100, if one of the actuating structures 90 becomes inoperable due the above reason, i.e., short-circuit, all of the other actuating structures 90 in the same row or column in the array 100 become inoperable.

SUMMARY OF THE INVENTION

It is, therefore, a primary object of the present invention to provide an improved method for establishing an electrical connection between a thin film electrode and a connecting terminal in a thin film actuated mirror, the method being capable of minimizing the effect of a heat treatment involved in the manufacture of the thin film actuated mirror.

In accordance with one aspect of the present invention, there is provided a method for electrically connecting a thin film electrode to a connecting terminal on an active matrix in a thin film actuated mirror, the method comprising the steps of: forming a thin film sacrificial layer having an empty cavity on top of the active matrix, wherein the empty cavity encompasses the connecting terminal; forming an elastic layer on top of the thin film sacrificial layer including the empty cavity; creating a hole on the elastic layer, the hole exposing the connecting terminal and having inner surfaces; forming the thin film electrode on top of the elastic layer including the inner surfaces of the hole to thereby establish an electrical connection between the thin film electrode to the connecting terminal; and filling the hole with an insulating material.

BRIEF DESCRIPTION OF THE DRAWINGS

The above and other objects and features of the present invention will become apparent from the following description of the preferred embodiments, when given in conjunction with the accompanying drawings, wherein.

DETAILED DESCRIPTION OF THE PREFERRED EMBODIMENTS

Figure 1:
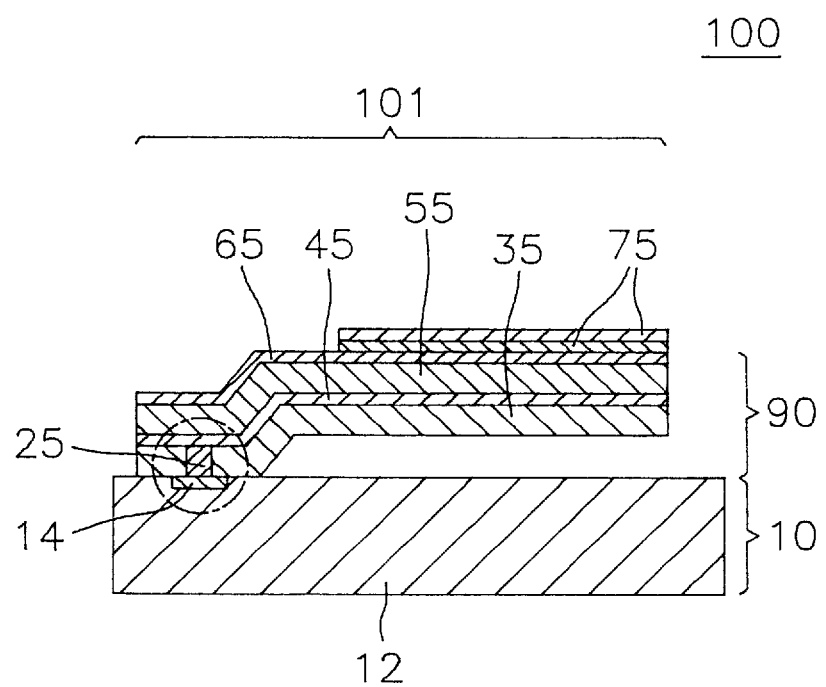
FIG. 1 shows a cross sectional view of an array of M×N thin film actuated mirrors previously disclosed.
Figure 2:
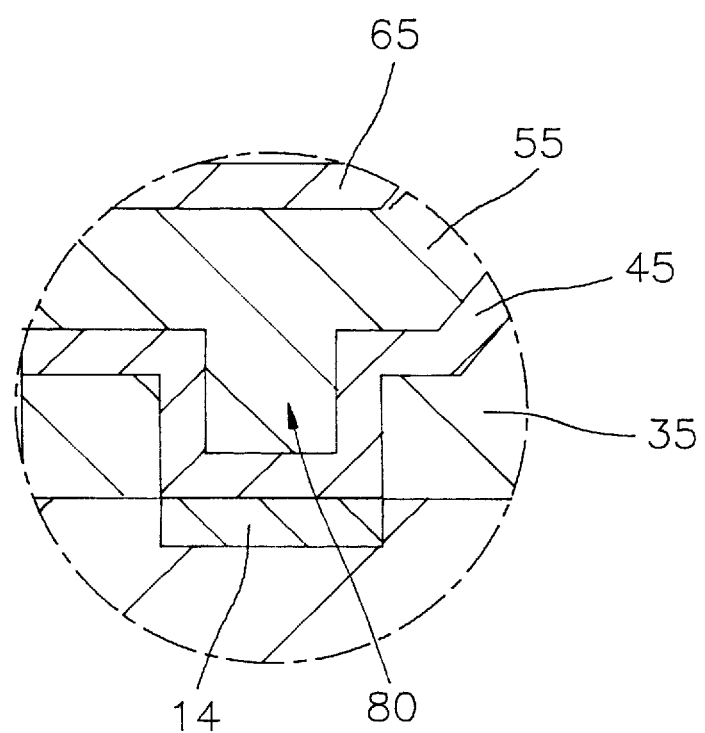
FIG. 2 presents a detailed view of a prior art contact hole in the thin film actuated mirror shown in FIG. 1.

There are provided in FIGS. 3A to 3E schematic cross sectional views setting forth a method for the manufacture of an array 300 of M×N thin film actuated mirrors 301, wherein M and N are integers, in accordance with the present invention. It should be noted that like parts appearing in FIGS. 3A to 3E are represented by like reference numerals.

The process for the manufacture of the array 300 begins with the preparation of an active matrix 210 including a substrate 212, an array of M×N connecting terminals 214 on top of the substrate 212 and an array of M×N transistors (not shown), wherein each of the connecting terminals 214 is electrically connected to a corresponding transistor in the array of transistors.

In a subsequent step, there is formed on top of the active matrix 210 a thin film sacrificial layer 220, having a thickness of 0.1–2 $\mu$m, and made of a metal, e.g., copper (Cu) or nickel (Ni), a phosphor-silicate glass (PSG) or a poly-Si. The thin film sacrificial layer 220 is formed by using a sputtering or an evaporation method if the thin film sacrificial layer 220 is made of a metal, a chemical vapor deposition (CVD) method or a spin coating method if the thin film sacrificial layer 220 is made of a PSG, or a CVD method if the thin film sacrificial layer 220 is made of a poly-Si.

Thereafter, there is formed an array of M×N pairs of empty cavities (not shown) in the thin film sacrificial layer 220 by using an wet or a dry etching method. One of the empty cavities in each pair encompasses one of the connecting terminals 214.

Figure 3A:
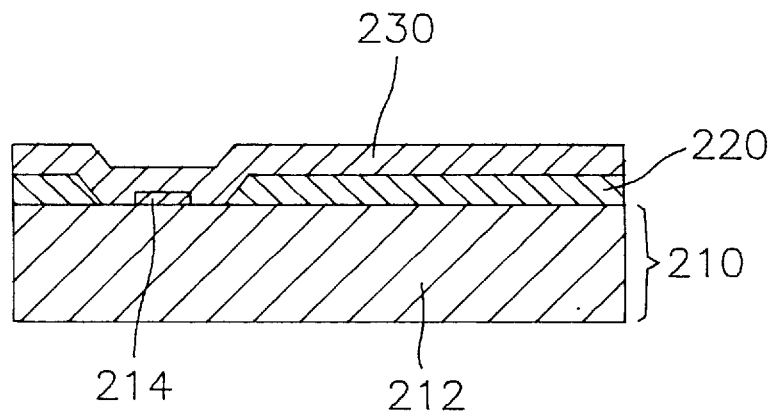
FIGS. 3A to 3E provide schematic cross sectional views setting forth a method for the manufacture of an array of M×N thin film actuated mirrors in accordance with one embodiment of the present invention.

Subsequently, an elastic layer 230, made of an insulating material, e.g., silicon nitride, and having a thickness of 0.1–2 $\mu$m, is deposited on top of the thin film sacrificial layer 220 including the empty cavities by using a CVD method, as shown in FIG. 3A.

Thereafter, there is formed in the elastic layer 230 an array of M×N contact holes (not shown) by using an etching method. Each of the contact holes exposes a corresponding connecting terminal 214, and has inner surfaces (not shown).

Figure 3B:
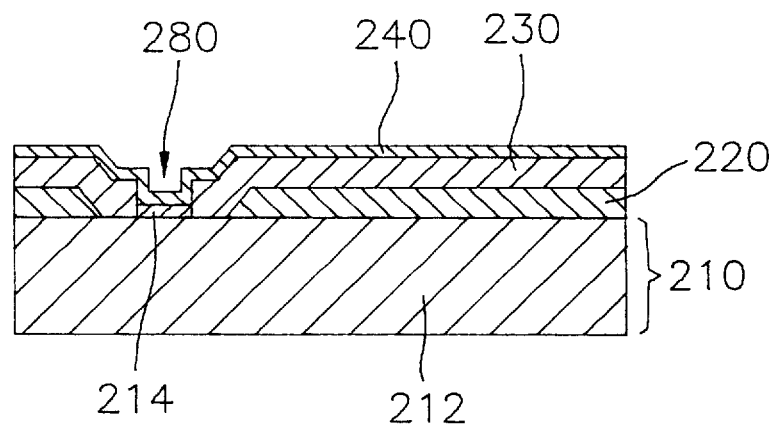

Then, a second thin film layer 240, made of an electrically conducting material, e.g., aluminum (Al), and having a thickness of 0.1–2 $\mu$m, is formed on top of the elastic layer 230 including the inner surfaces of each of the contact holes by using a sputtering or a vacuum evaporation method, as shown in FIG. 3B, resulting in an array of recessed portions 280 whose inner surfaces are covered with the second thin film layer 240.

Figure 3C:
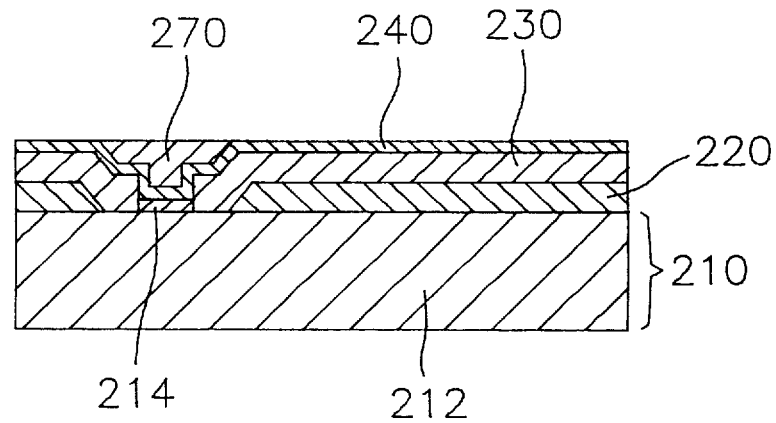

Subsequently, a material 270, e.g., a metal or an insulating material, is formed in each of the recessed portions 280 so that top of the material 270 is even with top of the second thin film layer 240, as shown in FIG. 3C.

Next, a thin film electrodisplacive layer 250, made of a piezoelectric material, e.g., lead zirconium titanate (PZT), or an electrostrictive material, e.g., lead magnesium niobate (PMN), and having a thickness of 0.1–2 $\mu$m, is formed on top of the second thin film layer 240 by using a CVD method, an evaporation method, a Sol-Gel method or a sputtering method. The thin film electrodisplacive layer 250 is then heat treated to allow a phase transition to take place.

Figure 3D:
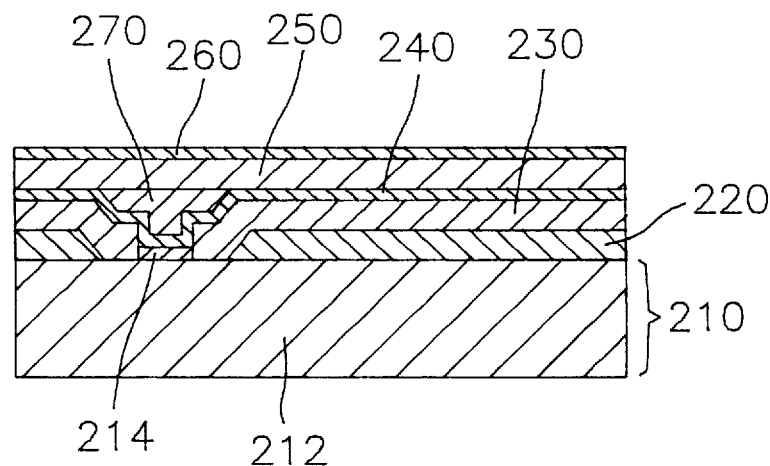

In an ensuing step, a first thin film layer 260, made of an electrically conducting and light reflecting material, e.g., aluminum (Al) or silver (Ag), and having a thickness of 0.1–2 $\mu$m, is formed on top of the thin film electrodisplacive layer 250 by using a sputtering or a vacuum evaporation method, as shown in FIG. 3D.

After the above step, the first thin film 260, the thin film electrodisplacive 250, the second thin film 240 and the elastic layers 230 are, respectively, patterned by using a photolithography or a laser trimming method, thereby forming an array of M×N actuating structures 200, each of the actuating structures 200 including a first thin film electrode 265, a thin film electrodisplacive member 255, a second thin film electrode 245 and an elastic member 235. Each of the second thin film electrodes 245 is electrically connected to a corresponding connecting terminal 214, thereby functioning as a signal electrode in each of the actuating structures 200. Each of the first thin film electrodes 265 is electrically connected to ground, thereby functioning as a mirror as well as a common bias electrode in each of the actuating structures 200.

Since each of the thin film electrodisplacive members 255 is sufficiently thin, there is no need to pole it in case it is made of a piezoelectric material: for it can be poled with the electric signal applied during the operation of the thin film actuated mirrors 301.

The preceeding step is then followed by completely covering each of the actuating structures 200 with a thin film protection layer (not shown).

Figure 3E:
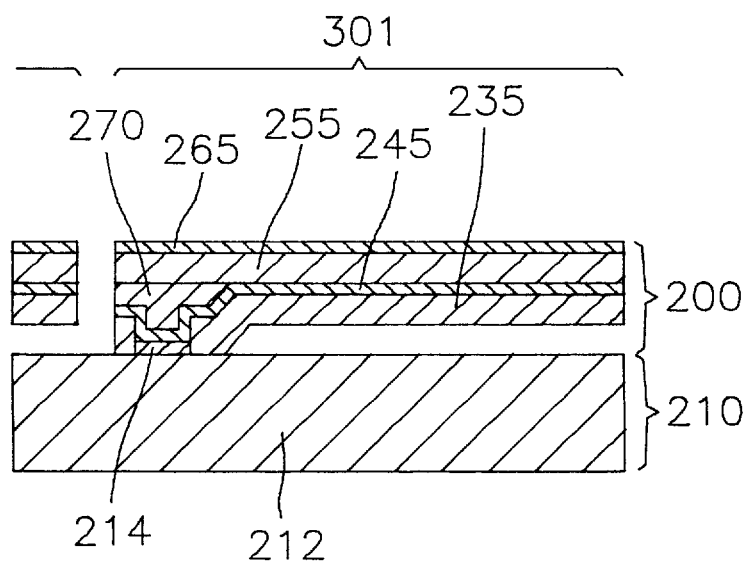

The thin film sacrificial layer 220 is then removed by using an etching method. Finally, the thin film protection layer is removed, thereby forming the array 300 of M×N thin film actuated mirrors 301, as shown in FIG. 3E.

In FIGS. 4A to 4F, there are presented schematic cross sectional views setting forth a method for the manufacture of an array 300 of M×N thin film actuated mirrors 301 in accordance with another embodiment of the present invention.

Figure 4A:
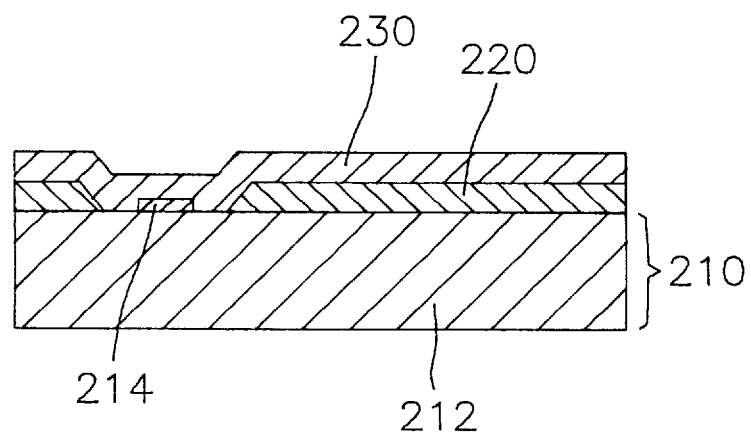
FIGS. 4A to 4F represent schematic cross sectional views setting forth a method for the manufacture of an array of M×N thin film actuated mirrors in accordance with another embodiment of the present invention.
Figure 4B:
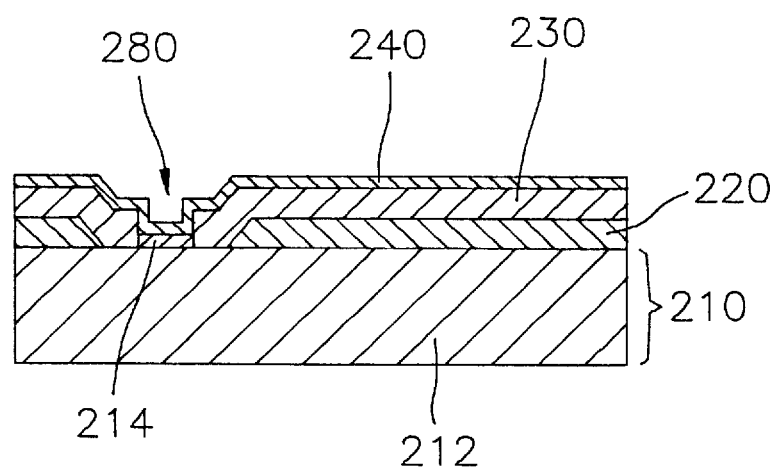
Figure 4C:
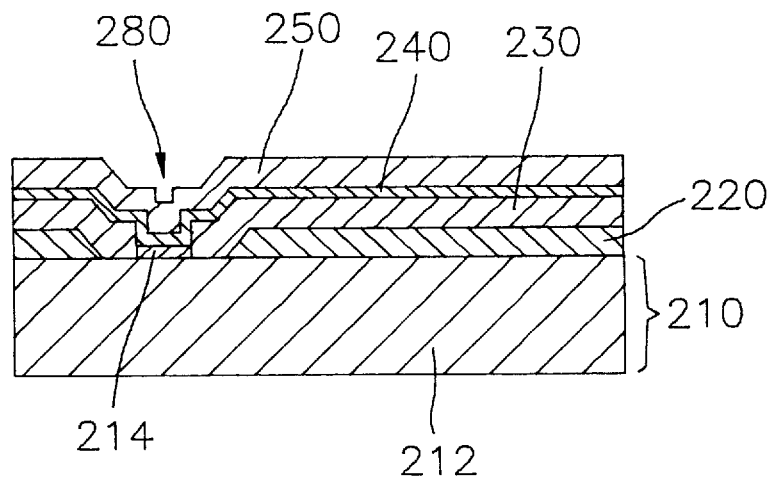

After the formation of the second thin film layer 240 on top of the elastic layer 230 including the inner surfaces of each of the contact holes by using a sputtering or a vacuum evaporation method, as shown in FIG. 3B, a thin film electrodisplacive layer 250 is formed on top of the second thin film layer 240 including each of the contact holes, resulting in an array of recessed portions 280 whose inner surfaces are covered with the second thin film layer 240 and the thin film electrodisplacive layer 250. The thin film electrodisplacive layer 250 is then heat treated to allow a phase transition to take place, as shown in FIG. 4C.

Figure 4D:
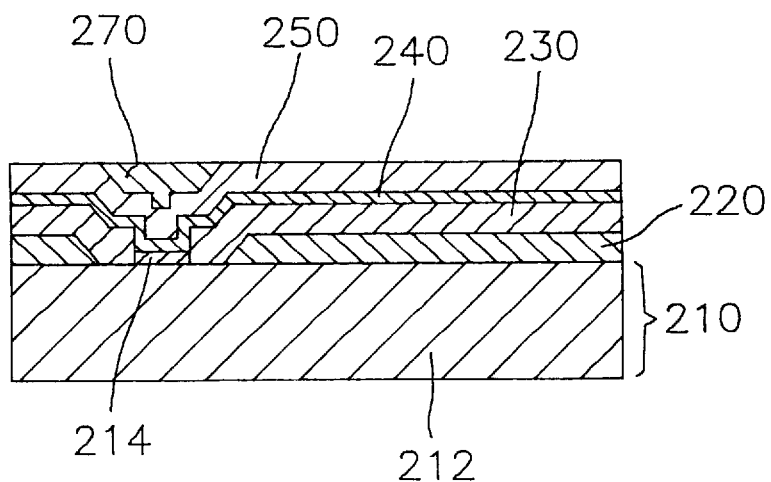

Subsequently, an insulating material 270 is formed in each of the recessed portions 280 so that top of the insulating material 270 is even with top of the thin film electrodisplacive layer 250, as shown in FIG. 4D.

Figure 4E:
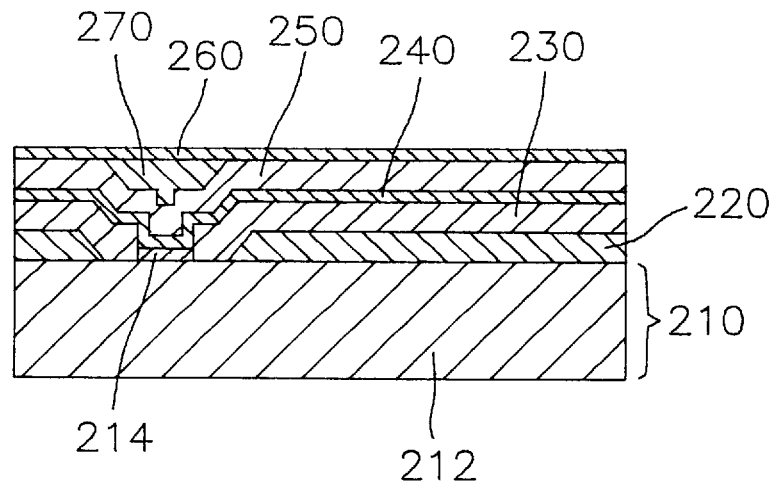

In an ensuing step, a first thin film layer 260 is formed on top of the thin film electrodisplacive layer 250, as shown in FIG. 4E.

After the above step, the first thin film 260, the thin film electrodisplacive 250, the second thin film 240 and the elastic layers 230 are, respectively, patterned, thereby forming an array of M×N actuating structures 200, each of the actuating structures 200 including a first thin film electrode 265, a thin film electrodisplacive member 255, a second thin film electrode 245 and an elastic member 235.

As in the first embodiment, since each of the thin film electrodisplacive members 255 is sufficiently thin, there is no need to pole it in case it is made of a piezoelectric material: for it can be poled with the electric signal applied during the operation of the thin film actuated mirrors 301.

The preceeding step is then followed by completely covering each of the actuating structures 200 with a thin film protection layer (not shown).

Figure 4F:
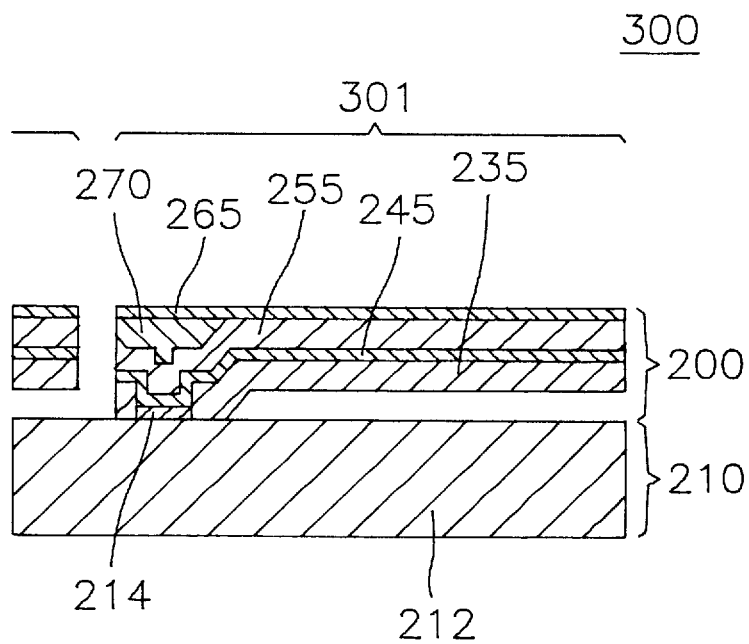

The thin film sacrificial layer 220 is then removed. Finally, the thin film protection layer is removed, thereby forming the array 300 of M×N thin film actuated mirrors 301, as shown in FIG. 4F.

In the above method for the manufacture of the array 300 of M×N thin film actuated mirrors 301, the insulating material 270 located either on top or bottom of a portion of the thin film electrodisplacive member 255 formed in the contact hole prevents the thin film electrodes in each of the thin film actuated mirrors 301 from coming into an electrical contact with each other, thereby preventing a short-circuit therebetween.

While the present invention has been described with respect to certain preferred embodiments only, other modifications and variations may be made without departing from the scope of the present invention as set forth in the following claims.

What is claimed is:

1. An array of thin film actuated mirrors for use in an optical projection system, wherein each of the thin film actuated mirrors includes an active matrix and an actuating structure, the active matrix including a substrate and a connecting terminal formed on top of the substrate, the actuating structure including a first thin film electrode, a thin film electrodisplacive member, a second thin film electrode and an elastic member, the first and the second thin film electrodes being above and below the electrodisplacive member, respectively, the array comprising:

a contact hole for electrically connecting the second thin film electrode to the connecting terminal; and means, other than said thin film electrodisplacive member, for preventing an electrical contact between the first and the second thin film electrodes.

2. The array of claim 1, wherein the means for preventing an electrical contact between the first and the second thin film electrodes is located between the second thin film electrode and the thin film electrodisplacive member.

3. The array of claim 1, wherein the means for preventing an electrical contact between the first and the second thin film electrodes is located between the first thin film electrode and the thin film electrodisplacive member.

4. The array of claim 1, wherein the means for preventing an electrical contact between the first and the second thin film electrodes is positioned substantially directly above the contact hole.

5. An array of thin film actuated mirrors for use in an optical projection system, wherein each of the thin film actuated mirrors includes an active matrix and an actuating structure, the active matrix including a substrate and a connecting terminal formed on top of the substrate, the actuating structure including a first thin film electrode, a thin film electrodisplacive member, a second thin film electrode and an elastic member, the first and the second thin film electrodes being above and below the electrodisplacive member, respectively, the array comprising:

a contact hole for electrically connecting the second thin film electrode to the connecting terminal; and means, other than said thin film electrodisplacive member, for preventing an electrical contact between the first and the second thin film electrodes, wherein the contact hole is formed on the elastic member.

6. The array of claim 5, wherein the means for preventing an electrical contact between the first and the second thin film electrodes is located between the second thin film electrode and the thin film electrodisplacive member.

7. The array of claim 5, wherein the means for preventing an electrical contact between the first and the second thin film electrodes is located between the first second thin film electrode and the thin film electrodisplacive member.

8. The array of claim 5, wherein the means for preventing an electrical contact between the first and the second thin film electrodes is positioned substantially directly above the contact hole.

9. An array of thin film actuated mirrors, each of said mirrors comprising an active matrix and an actuating structure, the active matrix comprising a connecting terminal formed atop a substrate, the actuating structure including a first thin film electrode, a thin film electrodisplacive member, and a second thin film electrode, the first and the second thin film electrodes being above and below the electrodisplacive member, respectively, said actuating structure further having:

an electrical connection between said connecting terminal and said second thin film electrode; and an insulating member spacing apart a first portion of the electrodisplacive member from one of the first and second thin film electrodes, said first portion being substantially directly above said electrical connection.

10. The array of claim 9, wherein the second thin film electrode abuts said connecting terminal.

11. The array of claim 10, wherein said insulating member spaces apart said electrodisplacive member from the first thin film electrode.

12. The array of claim 10, wherein said insulating member spaces apart said electrodisplacive member from the second thin film electrode.

* * * * *